(12) United States Patent
Lee

(10) Patent No.: US 11,568,324 B2
(45) Date of Patent: Jan. 31, 2023

(54) ADVERSARIAL TRAINING METHOD FOR NOISY LABELS

(71) Applicant: Samsung Display Co., Ltd., Yongin-si (KR)

(72) Inventor: Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 981 days.

(21) Appl. No.: 16/365,485

(22) Filed: Mar. 26, 2019

(65) Prior Publication Data

US 2020/0202257 A1 Jun. 25, 2020

Related U.S. Application Data

(60) Provisional application No. 62/783,150, filed on Dec. 20, 2018.

(51) Int. Cl.
*G06N 20/20* (2019.01)

(52) U.S. Cl.
CPC .................................. *G06N 20/20* (2019.01)

(58) Field of Classification Search
CPC ....... G06K 9/6263; G06V 10/82; G06N 20/20
See application file for complete search history.

(56) References Cited

U.S. PATENT DOCUMENTS

| 8,160,351 B2 | 4/2012 | Sandström et al. |
| 9,846,932 B2 | 12/2017 | Liu et al. |
| 2015/0154353 A1 | 6/2015 | Xiang et al. |
| 2017/0053211 A1* | 2/2017 | Heo ........................ G06N 20/20 |
| 2017/0132801 A1 | 5/2017 | Trenholm et al. |
| 2018/0060702 A1* | 3/2018 | Ma ........................ G06K 9/6228 |

(Continued)

FOREIGN PATENT DOCUMENTS

| CN | 106875373 A | 6/2017 |
| WO | 2018/156869 A1 | 8/2018 |

OTHER PUBLICATIONS

Yang, Hua et al: "Transfer-Learning-Based Online Mura Defect Classification". IEEE Transactions on Semiconductor Manufacturing, Feb. 2018, vol. 31, No. 1, pp. 116-123.

(Continued)

*Primary Examiner* — Abdullahi E Salad
(74) *Attorney, Agent, or Firm* — Lewis Roca Rothgerber Christie LLP

(57) ABSTRACT

A system includes a memory; and a processor configured to train a first machine learning model based on the first dataset labeling; provide the second dataset to the trained first machine learning model to generate an updated second dataset including an updated second dataset labeling, determine a first difference between the updated second dataset labeling and the second dataset labeling; train a second machine learning model based on the updated second dataset labeling if the first difference is greater than a first threshold value; provide the first dataset to the trained second machine learning model to generate an updated first dataset including an updated first dataset labeling, determine a second difference between the updated first dataset labeling and the first dataset labeling; and train the first machine learning model based on the updated first dataset labeling if the second difference is greater than a second threshold value.

20 Claims, 4 Drawing Sheets

(56) References Cited

U.S. PATENT DOCUMENTS

| | | |
|---|---|---|
| 2018/0107928 A1 | 4/2018 | Zhang et al. |
| 2018/0232601 A1 | 8/2018 | Feng et al. |
| 2019/0034766 A1* | 1/2019 | Chen ..................... G06N 20/10 |
| 2019/0155633 A1* | 5/2019 | Faulhaber, Jr. ..... G06F 9/45558 |
| 2020/0210867 A1* | 7/2020 | Banis .................... G06N 5/003 |

OTHER PUBLICATIONS

EPO Office Action dated Mar. 14, 2022, for corresponding European Patent Application No. 19206659.5 (11 pages).
Extended European Search Report for corresponding European Patent Application No. 19206659.5, dated Mar. 25, 2020, 9 pages.

* cited by examiner

ADVERSARIAL TRAINING METHOD FOR NOISY LABELS

CROSS-REFERENCE TO RELATED APPLICATION(S)

The present application claims priority to and the benefit of U.S. Provisional Patent Application Ser. No. 62/783,150, filed Dec. 20, 2018 and entitled "ADVERSARIAL TRAINING METHOD FOR NOISY LABELS," the entire content of which is hereby expressly incorporated by reference.

FIELD

One or more aspects of embodiments according to the present disclosure relate to adversarial training method for noisy labels.

BACKGROUND

In recent years, the display industry has been growing rapidly as new display technologies have been introduced to the market. Mobile devices, televisions, virtual reality (VR) headsets and other displays have been a constant force in driving displays to have higher resolutions and more accurate color reproductions. As new types of display panel modules and production methods have been deployed, surface defects have become harder to inspect using the conventional methods.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to adversarial training method for noisy labels.

In some embodiments, a system includes a memory; and a processor configured to execute instructions stored on the memory that, when executed by the processor, cause the processor to: receive a first dataset including a first dataset labeling; receive a second dataset including second dataset labeling; train a first machine learning model based on the first dataset labeling; provide the second dataset to the trained first machine learning model to generate an updated second dataset including an updated second dataset labeling, the updated second dataset being generated by classifying the second dataset using the trained first machine learning model; determine a first difference between the updated second dataset labeling and the second dataset labeling; train a second machine learning model based on the updated second dataset labeling if the first difference is greater than a first threshold value; provide the first dataset to the trained second machine learning model to generate an updated first dataset including an updated first dataset labeling, the updated first dataset being generated by classifying the first dataset using the trained second machine learning model; determine a second difference between the updated first dataset labeling and the first dataset labeling; and train the first machine learning model based on the updated first dataset labeling if the second difference is greater than a second threshold value.

In some embodiments, the instructions further cause the processor to continue to: train the first machine learning model and the second machine learning model until the first difference is below the first threshold value and the second difference is below the second threshold value. In some embodiments, the first threshold value and the second threshold value are approximately equal to zero, wherein the first threshold value is different from the second threshold value. In some embodiments, the instructions further cause the processor to continue to train the first machine learning model and the second machine learning model until both the first machine learning model and the second machine learning model produce the same dataset labeling results when applied to the updated second dataset and the updated first dataset. In some embodiments, the updated first dataset is generated by updating data sample labels for the data from the first dataset that have flipped to a new class after the trained second machine learning model is applied to the first dataset.

In some embodiments, the updated first dataset labeling is different from the first dataset labeling. In some embodiments, the first dataset is relabeled by live human inspectors according to the updated second dataset labeling to generate the updated first dataset. In some embodiments, the first machine learning model and the second machine learning model are classification algorithms. In some embodiments, the updated second dataset is generated by updating data sample labels for the data from the second dataset that have flipped to a new class after the trained first machine learning model is applied to the second dataset. In some embodiments, the first dataset is classified or labeled by live human inspectors.

In some embodiments, a system includes a memory; and a processor configured to execute instructions stored on the memory that, when executed by the processor, cause the processor to: train a first machine learning model based on a first dataset labeling of a first dataset; provide a second dataset including second dataset labeling to the trained first machine learning model to generate an updated second dataset including an updated second dataset labeling; train a second machine learning model based on the updated second dataset labeling; provide the first dataset to the trained second machine learning model to generate an updated first dataset including an updated first dataset labeling; and train the first machine learning model based on the updated first dataset labeling.

In some embodiments, the instructions further cause the processor to continue to: determine a first difference between the updated second dataset labeling and the second dataset labeling, wherein the second machine learning model is trained based on the updated second dataset labeling if the first difference is greater than a first threshold value; determine a second difference between the updated first dataset labeling and the first dataset labeling, wherein the first machine learning model is trained based on the updated first dataset labeling if the second difference is greater than a second threshold value; and train the first machine learning model and the second machine learning model until the first difference is below the first threshold value and the second difference is below the second threshold value. In some embodiments, the first threshold value and the second threshold value are approximately equal to zero, wherein the first threshold value is different from the second threshold value.

In some embodiments, the updated first dataset being generated by classifying the first dataset using the trained second machine learning model and the updated second dataset is generated by classifying the second dataset using the trained first machine learning model. In some embodiments, the instructions further cause the processor to continue to train the first machine learning model and the second machine learning model until both the first machine learning model and the second machine learning model produce the same dataset labeling results when applied to the updated second dataset and the updated first dataset.

In some embodiments, the updated first dataset is generated by updating data sample labels for the data from the first dataset that have flipped to a new class after the trained second machine learning model is applied to the first dataset, the updated first dataset labeling is different from the first dataset labeling, and the first dataset is relabeled by live human inspectors according to the updated second dataset labeling to generate the updated first dataset. In some embodiments, the first machine learning model and the second machine learning model are classification algorithms, wherein the first dataset is classified or labeled by live human inspectors, and wherein the updated second dataset is generated by updating data sample labels for the data from the second dataset that have flipped to a new class after the trained first machine learning model is applied to the second dataset.

In some embodiments, a method includes training, by a processor, a first machine learning model based on a first dataset labeling of a first dataset; providing, by the processor, a second dataset including second dataset labeling to the trained first machine learning model to generate an updated second dataset including an updated second dataset labeling; training, by the processor, a second machine learning model based on the updated second dataset labeling; providing, by the processor, the first dataset to the trained second machine learning model to generate an updated first dataset including an updated first dataset labeling; and training, by the processor, the first machine learning model based on the updated first dataset labeling.

In some embodiments, the method further includes determining, by the processor, a first difference between the updated second dataset labeling and the second dataset labeling, wherein the second machine learning model is trained based on the updated second dataset labeling if the first difference is greater than a first threshold value; determining, by the processor, a second difference between the updated first dataset labeling and the first dataset labeling, wherein the first machine learning model is trained based on the updated first dataset labeling if the second difference is greater than a second threshold value; and training, by the processor, the first machine learning model and the second machine learning model until the first difference is below the first threshold value and the second difference is below the second threshold value.

In some embodiments, the first threshold value and the second threshold value are approximately equal to zero, wherein the first threshold value is different from the second threshold value, and wherein the updated first dataset being generated by classifying the first dataset using the trained second machine learning model and the updated second dataset is generated by classifying the second dataset using the trained first machine learning model.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

The detailed description set forth below in connection with the appended drawings is intended as a description of some example embodiments of an adversarial training method for noisy labels provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In recent years, the mobile display industry has grown rapidly. As new types of display panel modules and production methods have been deployed, display resolutions and pixel densities have increase, and surface defects (e.g., defects in the organic light emitting diode (OLED) in the display panel) have become harder to inspect using conventional methods. Manual defect detection is too time consuming for modern manufacturing facilities, while automated inspection techniques are often ineffective. For example, in automated surface inspection, defects in uniform (e.g., non-textured) surfaces may be easily identified when the local anomalies have distinct contrasts from their regular surrounding neighborhood. Defects in the low-contrast images, however, are difficult to detect when the defects have no clear edges from their surroundings and the background presents uneven illumination.

One common type of display defect is "Mura." Mura is one large category of defects found in OLED manufacturing. Mura is a local brightness non-uniformity that causes an unpleasant sensation to human vision. According to the size and shape, the types of Mura may be roughly classified as line-Mura, spot-Mura, and region-Mura. Each type of Mura may not have distinct edges and may not be readily apparent in images. A new method for identifying Mura defects is therefore needed. Also, the processing time of the new method or algorithm for identifying Mura should be taken into consideration, as the processing time of such algorithm or method may directly affect the production efficiency of the OLED. Moreover, in order to achieve a fully automated surface inspection process, the classification of the defect types (e.g., Mura) in display panels (e.g., OLED display panels) is a necessity and will lead to an improvement in production efficiencies and to a reduction in requiring human visual inspections.

Figure 1A:
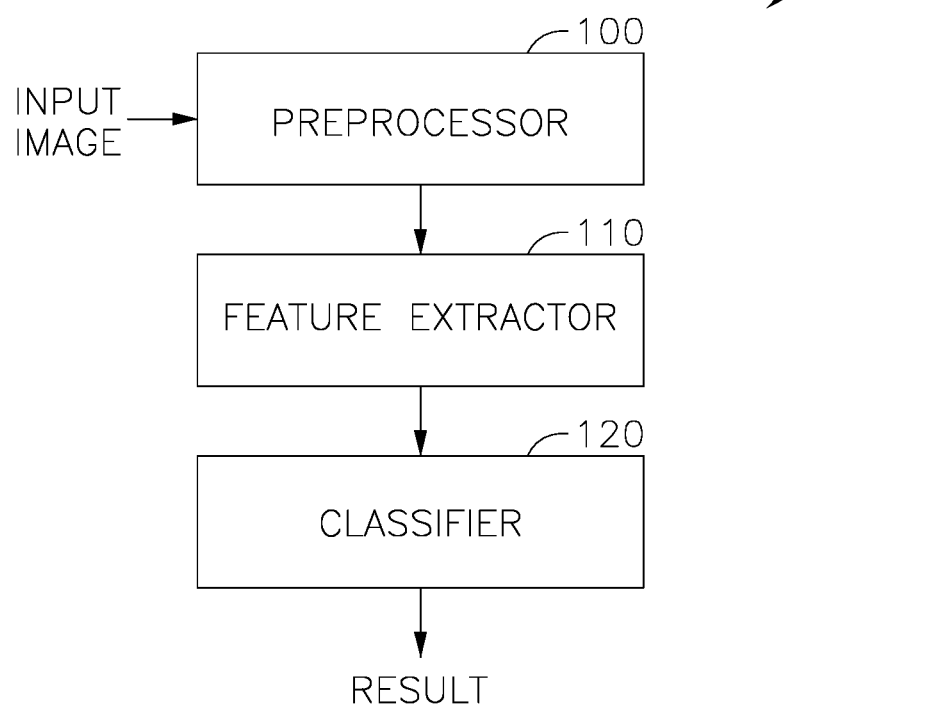
FIG. 1A illustrates a system overview according to some embodiments of the present disclosure.
Figure 1B:
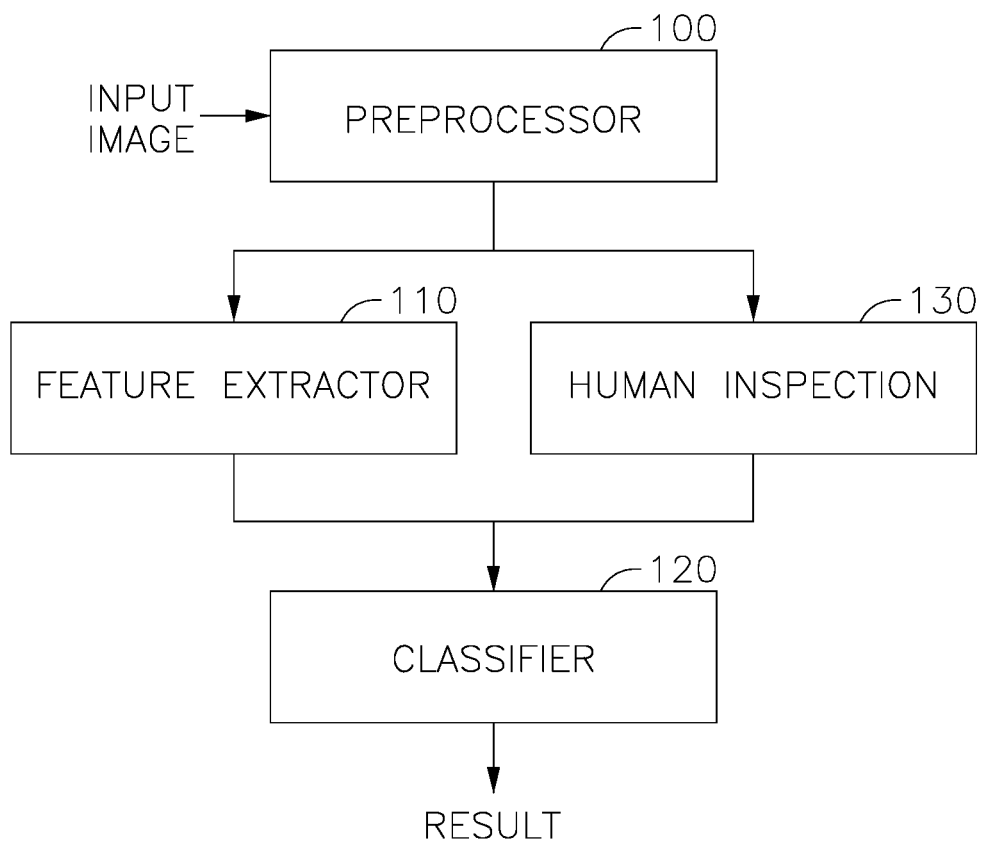
FIG. 1B illustrates a system overview for training the classifier according to some embodiments of the present disclosure.

FIG. 1A illustrates a system overview according to some embodiments of the present disclosure. FIG. 1B illustrates a system overview for training the classifier according to some embodiments of the present disclosure.

Referring to FIGS. 1A, and 1B, in some embodiments, the Mura detection system 101 receives an input image at a preprocessor 100. The input image may, for example, include an image of a display that is showing a test image. A camera may be used to generate the test image by taking a picture of the OLED display displaying the test image. In some embodiments, the test image may include an image that is likely to cause a display to exhibit instances of Mura (e.g., white spot Mura). For example, the test image may be a uniform image exhibiting low levels of contrast. The input image may also be of high enough resolution to show the individual pixels of the display being inspected for defects (e.g. white spot Mura). In some embodiments, the preprocessor 100 may be configured to receive the input image and perform smoothing to reduce the noise in the image. After reducing the noise in the input image, the preprocessor 100 may be configured to divide the image into a plurality of image patches. Each of the image patches may then be supplied to a feature extractor 110.

In some embodiments, the feature extractor 110 is configured to calculate various statistical features for a supplied image patch. For example, the statistical features may include one or more image moments (e.g., a weighted average of pixels' intensities) and one or more texture measurements (e.g., texture analysis using a Gray-Level Co-Occurrence Matrix (GLCM)). For example, in various embodiments, 37 statistical features including various image moments and GLCM texture features are extracted by the feature extractor 110. In some embodiments, the feature extractor 110 may be configured to calculate mu 30 moments (3rd order centroid moments), contrast (GLCM), Hu 5 moments (Hu moments), Hu 1 moments (1st Hu invariant moment), and correlation/dissimilarity (GLCM) for each image patch.

In some embodiments, the statistical features of each image patch extracted are supplied as input to the classifier 120. In some embodiments, the classifier 120 is a machine learning classifier that uses the extracted features (e.g., a feature vector) and label class information to identify instances of defects (e.g., Mura). In some embodiments, the machine learning algorithm used in the classifier 120 localizes the location of defects and classifies the defect types. In some embodiments, the class information is supplied by training the classifier 120.

In machine learning, classification may be defined as the process of predicting the class of given data points in a dataset. The concept of classification in machine learning may include building a model that separates data into distinct classes. In some embodiments, classes may be called targets or labels or categories. Classification predictive modeling may be approximating a mapping function from input variables to discrete output variables in a dataset. The classification model may be built by inputting a set of training data for which the classes are pre-labeled in order for the algorithm to learn from. The model may then be used by inputting a different dataset (e.g., test dataset) for which the classes are withheld, allowing the model to predict their class membership based on what it has learned from the training dataset. As the classification algorithms (e.g., decision trees, naive Bayes, artificial neural networks (ANN), k-Nearest Neighbor (KNN)) require explicit class labeling, classification is a form of supervised learning.

Many classification algorithms (e.g., decision trees, naive Bayes, ANN, KNN) may be available, but it may be difficult to conclude which classification algorithm is superior to the other. The classification algorithm may be selected based on the application and nature of available data set. For example, if the classes or labels are linearly separable, the linear classifiers like Logistic regression, Fisher's linear discriminant may outperform sophisticated models and vice versa.

As the classifier 120 utilizes a supervised learning model, the classifier 120 is trained before being functional. In some embodiments, the supervised learning model used in the classifier 120 is a support vector machine. The supervised learning model (e.g. the support vector machine) may be trained by providing human input 130 to the classifier 120 during the training phase. For example, for each image patch, a live human may visually inspect the patch and mark any instances of white spot Mura. The image patches are also provided to the feature extractor 110. The feature vector extracted for the image patch and the corresponding human inspected and marked patch (e.g., training dataset) are both provided to the classifier 120. The classifier 120 utilizes these provided patches (e.g., training dataset) to generate class information (i.e. builds a model) for later use in classification.

In some embodiments, the performance of the supervised learning model (e.g. the support vector machine) depends (e.g., critically depends) on the amount of labeled examples in the training dataset, and the labels are assumed to be unambiguous and accurate. However, this assumption often does not hold in real life dataset, for example, in case of training and/or test datasets with missing labels, subjective labeling, or inexhaustively-annotated images in the training dataset. For example, in the training dataset for the supervised learning model, the class labels may be missing, the objects in the image may not all be localized or live human experts (e.g., 130) may not even agree on the class labels. As the training dataset for the classification algorithm used in the supervised learning model becomes larger, the problem of missing and noisy labels in the test dataset becomes more acute. Regardless of its source, the resulting noise from the noisy labels may drastically degrade learning performance of the machine learning model.

In some embodiments, in order to use the machine learning model for classification of a dataset with real-life data, it may be desirable to solve the noisy label issues in the dataset. For example, subjective labeling and inexhaustively-annotated test dataset makes it difficult to evaluate the performance of the machine learning model, as such noisy labels may be detected as misdetection or misclassification.

In some example embodiments, dataset that has been labeled from multiple live human inspectors may suffer from subjective labeling issues because such labeling depends on individual inspector's inspection results. In some embodiments, a test dataset may have subjective labeling issues for the real life problems, for example, it may be challenging to make a clear judgement in the real life problems (e.g., defect detection including Mura detection). In some embodiments, it may be challenging to develop a machine learning model (e.g., classification algorithm) if there is a conflict between training dataset and test dataset, which may be a common occurrence in case of real datasets.

In some example embodiments, the entire content of a dataset may not be exhaustively labeled for all classification defects. Human inspectors may be used to label or classify for only few of the outstanding defects in the dataset. However, such inexhaustively labeled dataset may cause issues in training dataset, because such inexhaustively labeled (e.g., underfitted) training dataset may have missing labels and inconsistent labeling. In some embodiments, inexhaustively labeled dataset may make the machine learning model hard to evaluate using test dataset as the noisy labels may be detected as misdetection or misclassification. For example, all data needs to be exhaustively marked to maintain the same detection standard over all defect locations. It may not cause subjective labeling issue. However, it may be hard to discriminate subject labeling issue from in-exhaustively annotated issue for mixed dataset of exhaustively annotated and in-exhaustively annotated datasets.

As discussed above, because the classification algorithms require explicit class labeling, classification is a form of supervised learning. The bias-variance tradeoff is a central problem in supervised learning. The bias-variance tradeoff may be the property of a set of predictive models, where a model with a lower bias in parameter estimation may have a higher variance of the parameter estimate across samples, and vice versa. The bias may be an error from erroneous assumptions in the learning algorithm. In some embodiments, high bias may cause an algorithm to miss the relevant relations between features and target outputs (e.g., underfitting). The variance may be an error from sensitivity to small fluctuations in the training set. In some embodiments, high variance may cause an algorithm to model the random noise in the training data, rather than the intended outputs (e.g., overfitting). In some embodiments, the bias-variance decomposition is a way of analyzing a learning algorithm's expected generalization error with respect to a particular problem as a sum of three terms, the bias, variance, and the irreducible error, resulting from noise in the problem itself. In some embodiments, the bias-variance problem may be the conflict in trying to simultaneously minimize these two sources of error (e.g., bias and variance) that may prevent supervised learning algorithms from generalizing beyond their training set. The bias-variance tradeoff may apply to all forms of supervised learning, for example, classification, regression, structured output learning, or the like.

In some embodiments, it may be ideal to choose a model that both accurately captures the regularities in its training data, but also generalizes well to unseen data. However, it may be difficult to do both simultaneously. High-variance learning methods may be able to represent their training set well but are at risk of overfitting to noisy or unrepresentative training data. In contrast, algorithms with high bias may produce simpler models that may not tend to overfit but may underfit their training data, failing to capture important regularities. Although there are several classification algorithms, it may be difficult to classify the dataset representing the defects in OLED with high reliability because of non-uniform properties of the image displayed in the OLED displays. Also, it may be challenging to develop a machine learning model (e.g., classification algorithm) if there is a conflict between training dataset and test dataset, which may be a common occurrence in case of real datasets.

Most of the related art supervised learning algorithms are expected to identify ground truth label for a sample to develop a model and check the performance, which may not be the case for datasets that suffer from subjective labeling issues. In defect detection like Mura detection, it is easy to see the subjective labeling and inexhaustive labeling on training and test datasets. However, it may not be easy to relabel dataset (e.g., test dataset) correctly by inspecting again. Therefore, a method (or algorithm) may be desired to relabel the dataset with agreeable performance measures, such as accuracy, precision, or recall, to make a valid machine learning model.

The different example embodiments of the present disclosure may provide a training method for the machine learning model to overcome the problems (e.g., overfitting or underfitting training data) associated with noisy labels in training and/or test datasets, and may create a balanced model to achieve high accuracy for real life datasets (e.g., defect detection in training or test datasets). The different example embodiments of the present disclosure may also provide a training method to gradually reduce the disagreement regarding classification between training dataset and test dataset, and create a countable dataset for training and test to meaningfully evaluate the machine learning model. Some example embodiments of the present disclosure may reduce the amount of review required from different live human inspectors to resolve subjective labeling issues, reduce the amount of review required to resolve the outstanding defects from inexhaustively labeled dataset, and provide a tool or architecture (e.g., machine learning model or classification algorithm) to help for re-labeling data samples (e.g., training and/or test dataset) so that multiple inspectors may have a clear idea for each data samples.

Some example embodiments of the present disclosure may provide a method to train a machine learning model on datasets with noisy labels (e.g., subjective labeling and inexhaustive labeling issues). Some example embodiments of the present disclosure may include training two different machine learning models (e.g., classification algorithm) using two different datasets (e.g., golden dataset or training dataset and new dataset or test dataset) and compare the results between the other dataset (e.g., compare the dataset labeling in the updated golden dataset of the current cycle with the dataset labeling in the golden dataset of previous cycle, for example, compare the updated dataset labeling of a dataset with the previous dataset labeling of the same dataset), and converge the results iteratively until a target performance measure, such as accuracy, precision, or recall, is achieved. Some example embodiments of the present disclosure may provide a way to show disagreement only from each side (training or testing) and reduce the gap between two different datasets) may also include a way to finish the iteration by comparing the classification or detection results of two machine learning models. In some embodiments, the method further provides a solution when one of the datasets (e.g., training dataset) does not have enough data size to make right classification for the other dataset (e.g., test dataset).

Figure 2:
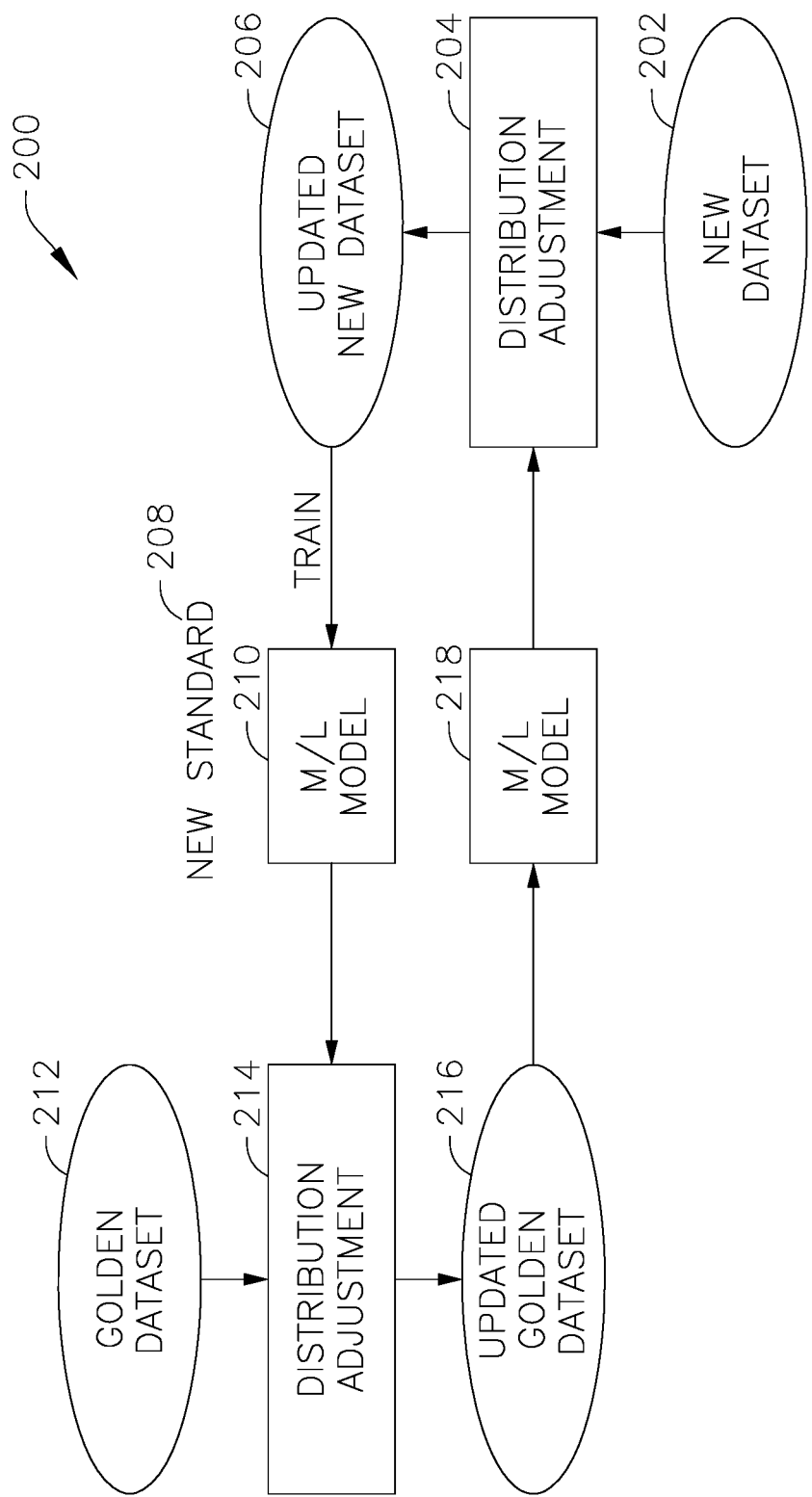
FIG. 2 illustrates an example block diagram of an adversarial training method, according to some embodiments of the present disclosure.
Figure 3:
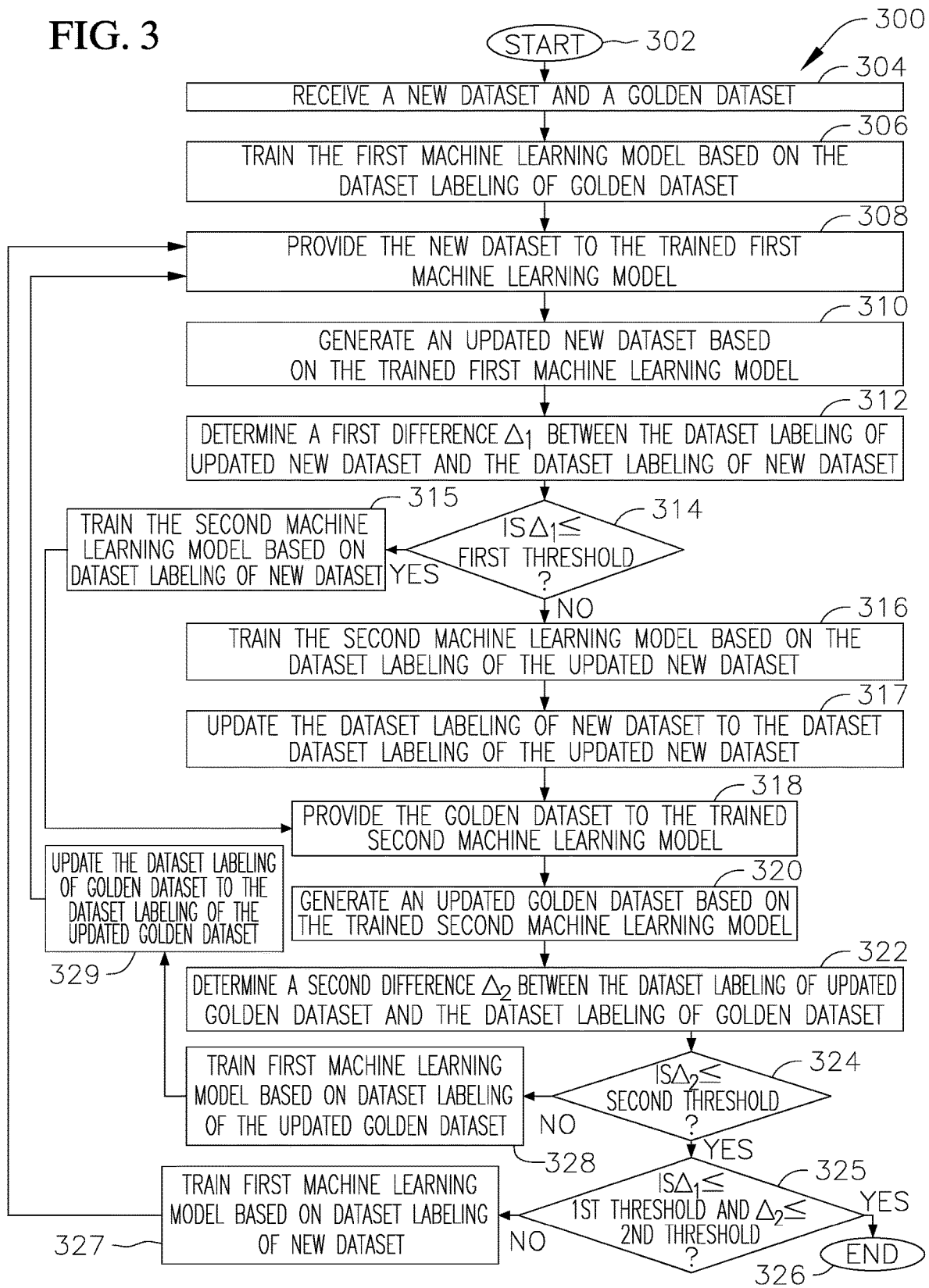
FIG. 3 illustrates a flow chart illustrating the adversarial training method of FIG. 2, according to some embodiments of the present disclosure.

FIG. 2 illustrates an example block diagram of an adversarial training method 200. FIG. 3 illustrates a flow chart 300 illustrating the adversarial training method 200 of FIG. 2. The adversarial training method of FIG. 2 provides a way to update two datasets with different data distribution (e.g., dataset labeling) and make an agreement in the middle ground. The adversarial training method of FIG. 2 iterates two machine learning models 210 and 218 (or two classification algorithms), until the two machine learning models 210 and 218 show the same results (e.g., same dataset labeling result) on updated golden dataset 216 and updated new dataset 206. By iteratively reducing the disagreement on both datasets, the adversarial training method 200 would reach the point where two machine learning models 210 and 218 generate same results for both datasets.

The adversarial training method 300 of FIG. 3 will be discussed in the following paragraphs with respect to the block diagram of FIG. 2. The adversarial training method 300 of FIG. 3 may be performed by a processor in a system that includes a memory and the processor is configured to execute instructions stored on the memory.

The adversarial training method 300 starts at 302.

At 304, a new dataset 202 and a golden dataset 212 are received.

In some embodiments, the golden dataset 212 refers to the dataset that has been labeled by live human experts. Therefore, the golden dataset 212 is a trustable data source to be used as training dataset for the machine learning algorithm for OLED defect detection (e.g., Mura detection). The golden dataset 212 has different dataset labeling than the new dataset 202. For example, the golden dataset 212 may include a first dataset labeling and the new dataset 202 may include a second dataset labeling.

Optionally, at 306, a first machine learning model 218 may be trained based on the dataset labeling of the golden dataset 212 (e.g., first dataset labeling).

At 308, the new dataset 202 is provided to the trained first machine learning model 218 to relabel the new dataset 202. In some embodiments, a first distribution adjustment module 204 may apply the trained first machine learning model 218 to the new dataset 202.

At 310, an updated new dataset 206 is generated based on the trained first machine learning model 218. For example, the updated new dataset 206 is generated by classifying the new dataset 202 using the trained first machine learning model 218. The updated new dataset 206 may have a new standard 208 or updated dataset labeling (e.g., updated second dataset labeling) which is different from the dataset labeling of the new dataset 202 (e.g., second dataset labeling). For example, the updated new dataset 206 may include an updated second dataset labeling. In some embodiments, the new dataset 202 and the updated new dataset 206 may contain the same data but different labeling, for example, the new dataset 202 includes a second dataset labeling and the updated new dataset 206 includes an updated second dataset labeling. The updated new dataset 206 updates data sample labels for the data (of the new dataset 202) that have flipped to a new class after the first machine learning model 218 is applied to the new dataset 202.

At 312, a first difference $\Delta_1$ is determined between the dataset labeling of the updated new dataset 206 (e.g., updated second dataset labeling) and the dataset labeling of the new dataset 202 (e.g., second dataset labeling), where, $$\Delta_1=(\text{updated second dataset labeling}-\text{second dataset labeling}).$$

At 314, the first difference $\Delta_1$ is compared with a first threshold. At 314, if $\Delta_1$ is determined to be less than or equal to the first threshold value (approximately equal to zero), at 315, the second machine learning model 210 is trained based on the dataset labeling of the new dataset 202 (e.g., second dataset labeling). From 315, the algorithm 300 proceeds to 318.

However, at 314, if $\Delta_1$ is determined to be greater than the first threshold value, at 316 the second machine learning model 210 is trained based on the new standard 208 or the dataset labeling of the updated new dataset 206 (e.g., updated second dataset labeling).

At 317, the dataset labeling of the new dataset 202 (e.g., second dataset labeling) is updated to the dataset labeling of the updated new dataset 206 (e.g., updated second dataset labeling).

At 318, the golden dataset 212 is provided to the trained second machine learning model 210. In some embodiments, a second distribution adjustment module 214 may apply the trained second machine learning model 210 to the golden dataset 212.

At 320, an updated golden dataset 216 is generated based on the trained second machine learning model 210. For example, the updated golden dataset 216 is generated by classifying the golden dataset 212 using the trained second machine learning model 210. The updated golden dataset 216 may have an updated dataset labeling or an updated first dataset labeling which is different from the dataset labeling of golden dataset 212 (e.g., the first dataset labeling). In some embodiments, the golden dataset 212 and the updated golden dataset 216 may contain the same data but different labeling, for example, the golden dataset 212 includes the first dataset labeling and the updated golden dataset 216 includes the updated first dataset labeling. The updated golden dataset 216 updates data sample labels for the data (of the golden dataset 212) that have flipped to a new class after the second machine learning model 210 is applied to the golden dataset 212.

At 322, a second difference $\Delta_2$ is determined between the dataset labeling of the updated golden dataset 216 (e.g., updated first dataset labeling) and the dataset labeling of the golden dataset 212 (e.g., first dataset labeling), where, $$\Delta_2=(\text{updated first dataset labeling}-\text{first dataset labeling}).$$

In some embodiments, at 322, the dataset labeling of the updated golden dataset 216 in a current cycle is compared with the dataset labeling of the same dataset in the previous cycle to determine $\Delta_2$. In some embodiments, the second distribution adjustment module 214 may compare the dataset labeling of the updated golden dataset 216 (e.g., updated first dataset labeling) with the dataset labeling of the golden dataset 212 (e.g., first dataset labeling) to determine the second difference $\Delta_2$.

At 324, the second difference $\Delta_2$ is compared with a second threshold.

At 324, if $\Delta_2$ is determined to be less than or equal to the second threshold value (approximately equal to zero), at 325, the processor determines if $\Delta_1$ is less than or equal to the first threshold value and if $\Delta_2$ is less than or equal to the second threshold value.

If at 325, it is determined that $\Delta_1$ is less than or equal to the first threshold and $\Delta_2$ is less than or equal to the second threshold value, at 326, the adversarial training method 300 ends.

However, if at 325, it is determined that $\Delta_1$ is not less than or equal to the first threshold value and $\Delta_2$ is not less than or equal to the second threshold value, at 327, the first machine learning model 218 is trained based on the dataset labeling of the new dataset 202 (e.g., second dataset labeling). From 327, the algorithm 300 returns to 308.

At 324, if the second difference $\Delta_2$ is determined to be greater than the second threshold value, at 328, the first machine learning model 218 is trained (or updated) based on the dataset labeling of the updated golden dataset 216 (e.g., updated first dataset labeling).

At 329, the dataset labeling of the golden dataset 212 (e.g., first dataset labeling) is updated to the dataset labeling of the updated golden dataset 216 (e.g., updated first dataset labeling).

From 329, the algorithm 300 returns to 308, and the process 300 continues.

By iteratively running the training procedures for the machine learning models 210 and 218, smaller differences or smaller $\Delta_1$ and $\Delta_2$ may be achieved for every iteration, which may provide more clear view for boundary since the inspectors only review data at the decision boundary. The adversarial training method 300 may be finalized when two machine learning models 210 and 218 generate same results for both datasets (e.g., updated golden dataset 216 and updated new dataset 206).

In some embodiments, the first distribution adjustment module 204 and the second distribution adjustment module 214 select data samples to flip the decision (e.g., if it is not sure to make a decision, just leave that sample for next round) when the updated new dataset 206 or the updated golden dataset 216 are generated.

In some embodiments, noisy labels or mislabels in golden dataset 212 or new dataset 202 may be identified by live human inspectors and the updated golden dataset 216 and updated new dataset 206 are generated. It is recommended to use the same inspectors to review golden dataset 212 and the new dataset 202 to reduce the subjective labeling issue. By reducing disagreements in the dataset, inspector might have a hunch for the real decision boundary. It could be a multiple iteration (of the adversarial training method 300) for updating new standard 208 and train machine learning models 210 and 218 until all inspectors would agree on results (e.g., dataset labeling) from both updated golden dataset 216 and updated new dataset 206.

In some embodiments, the live human inspectors may review the entire golden dataset 212 to relabel according to the new standard 208 for dataset labeling of the updated new dataset 206 (e.g., updated second dataset labeling) and generate updated golden dataset 216. However, updated golden dataset 216 generated by relabeling the golden dataset 212 by the live human inspectors according to the new standard 208 (e.g., updated second dataset labeling) may suffer from subjective labeling issues. Therefore, a machine or machine learning model (e.g., 210) to relabel the golden dataset 212 with new standard 208 (e.g., updated second dataset labeling) is desirable.

The adversarial training method 300 may be extended to a new evaluation dataset by mixing two test datasets (e.g., 202) as new golden dataset. A new evaluation dataset may be received, which may be used as the new dataset and the adversarial training method 300 may be applied.

In some example embodiments, a special sample that is not too different from other samples for dataset labeling purposes, may be included to both datasets (e.g., new dataset 202 and the golden dataset 212). This may happen for a dataset that is too small to train all details. In such a case, a synthetic dataset may be generated for covering that sample or find something similar in one of bigger datasets and add to the other dataset.

In some example embodiments, training the machine learning models 210 and 218 my imply training one or more of the localizer, feature extractor (e.g., 110), and/or classifier (e.g., 120). In some embodiments, the classifier (e.g., 120) may apply the classification process to a dataset and find differences to use in distribution adjustment procedure (e.g., 300). In some embodiments, the classifier (e.g., 120) and the feature extractor (e.g., 110) may update feature set as well, which may be similar to finding difference. In some embodiments, the localizer, feature extractor (e.g., 110), and the classifier (e.g., 120) may generate new location of detection. Therefore, the classification candidate location may be updated as well.

Figure 4:
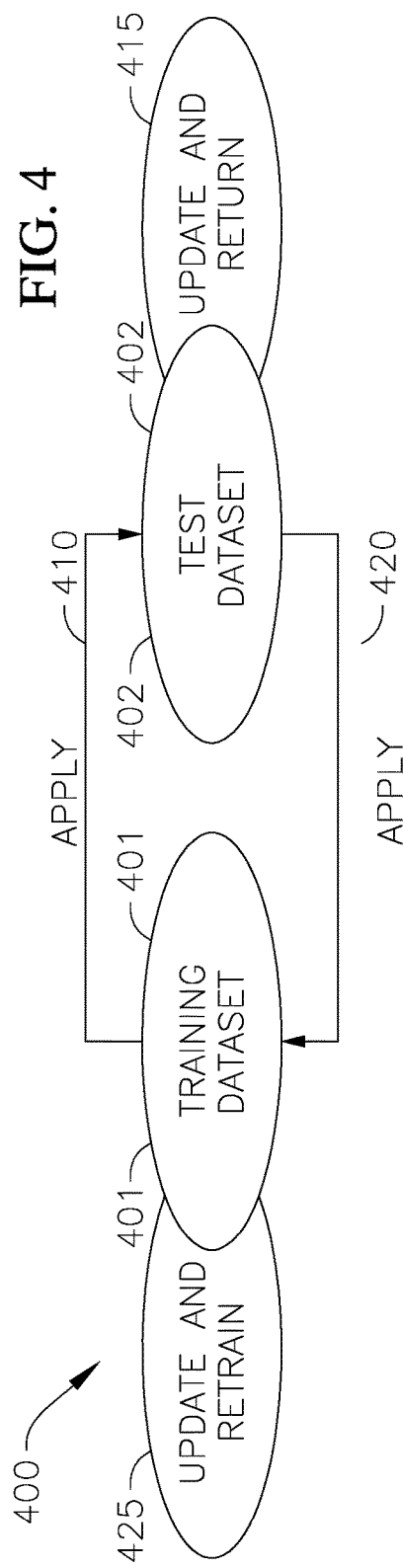
FIG. 4 illustrates an example block diagram of another adversarial training method, according to some embodiments of the present disclosure.

FIG. 4 illustrates an example block diagram of another adversarial training method 400. The adversarial training method 400 of FIG. 4 may be performed by a processor in a system that includes a memory and the processor is configured to execute instructions stored on the memory.

In the adversarial training method 400, a training dataset 401 and a test dataset 402 are received. The training dataset 401 may include a first dataset labeling and the test dataset 402 may include a second dataset labeling. In some embodiments, the machine learning model 410 may be trained using the dataset labeling of the training dataset 401 (e.g., first dataset labeling).

The test dataset 402 is provided to the trained machine learning model 410 to relabel the test dataset 402. An updated test dataset 415 is generated based on the trained machine learning model 410. For example, the updated test dataset 415 is generated by classifying the test dataset 402 using the trained machine learning model 410. The updated test dataset 415 may have an updated standard for dataset labeling or updated second dataset labeling which is different from the dataset labeling for the test dataset 402 (e.g., second dataset labeling). The updated test dataset 415 is retained (e.g., stored in the memory).

Next, the dataset labeling of the updated test dataset 415 (e.g., updated second dataset labeling) is compared with the dataset labeling of the test dataset 402 (e.g., second dataset labeling) to determine a first difference $\Delta_1$ between the updated second dataset labeling and the second dataset labeling, where, $\Delta_1$=(updated second dataset labeling−second dataset labeling).

If $\Delta_1$ is determined to be less than or equal to a first threshold value (approximately equal to zero), the machine learning model 420 is trained based on the dataset labeling of the test dataset 402 (e.g., second dataset labeling).

However, if $\Delta_1$ is determined to be greater than the first threshold value, the machine learning model 420 is trained based on the dataset labeling of the updated test dataset 415 (e.g., updated second dataset labeling). The dataset labeling of the test dataset 402 (e.g., second dataset labeling) is updated to the dataset labeling of the updated test dataset 415 (e.g., updated second dataset labeling).

Next, the training dataset 401 is provided to the trained machine learning model 420 to relabel the training dataset 401. An updated training dataset 425 is generated based on the trained machine learning model 420. For example, the updated training dataset 425 is generated by classifying the training dataset 401 using the trained machine learning model 420. The updated training dataset 425 may have an updated first dataset labeling, which is different from the original dataset labeling or the first dataset labeling of the training dataset 401. The updated training dataset 425 is retained.

Next, the dataset labeling of the updated training dataset 425 (e.g., updated first dataset labeling) is compared with the dataset labeling of the training dataset 401 (e.g., first dataset labeling) to determine a second difference $\Delta_2$ between the updated first dataset labeling and the first dataset labeling, where, $\Delta_2$=(updated first dataset labeling−first dataset labeling).

In some embodiments, the dataset labeling (e.g., updated first dataset labeling) of the updated training dataset 425 in a current cycle is compared with the dataset labeling (e.g., first dataset labeling) of the same dataset in the previous cycle to determine $\Delta_2$.

If the second difference $\Delta_2$ is less than or equal to a second threshold value (approximately equal to zero), the processor determines if $\Delta_1$ is less than or equal to the first threshold value and if $\Delta_2$ is less than or equal to the second threshold value.

If it is determined that $\Delta_1$ is less than or equal to the first threshold value and of $\Delta_2$ is less than or equal to the second threshold value, the adversarial training method 400 ends.

However, if it is determined that $\Delta_1$ is not less than or equal to the first threshold value and $\Delta_2$ is not less than or equal to the second threshold value, the machine learning model 410 is trained based on the dataset labeling of the test dataset 402 (e.g., second dataset labeling).

If the second difference $\Delta_2$ is determined to be greater than the second threshold value, the machine learning model 410 is updated or trained (or adjusted) based on the dataset labeling of the updated training dataset 425 (e.g., updated first dataset labeling).

The dataset labeling of the training dataset 401 (e.g., first dataset labeling) is updated to the dataset labeling of the updated training dataset 425 (e.g., updated first dataset labeling) and the process 400 continues. The adversarial training method 400 may be finalized when two machine learning models 410 and 420 generate same results for both datasets (e.g., updated training dataset 425 and updated test dataset 415).

By iteratively running the training procedures for the machine learning models 410 and 420, smaller differences or smaller $\Delta_1$ and $\Delta_2$ may be achieved for every iteration, which may provide more clear view for boundary since the inspectors only review data at the decision boundary.

Figure 5:
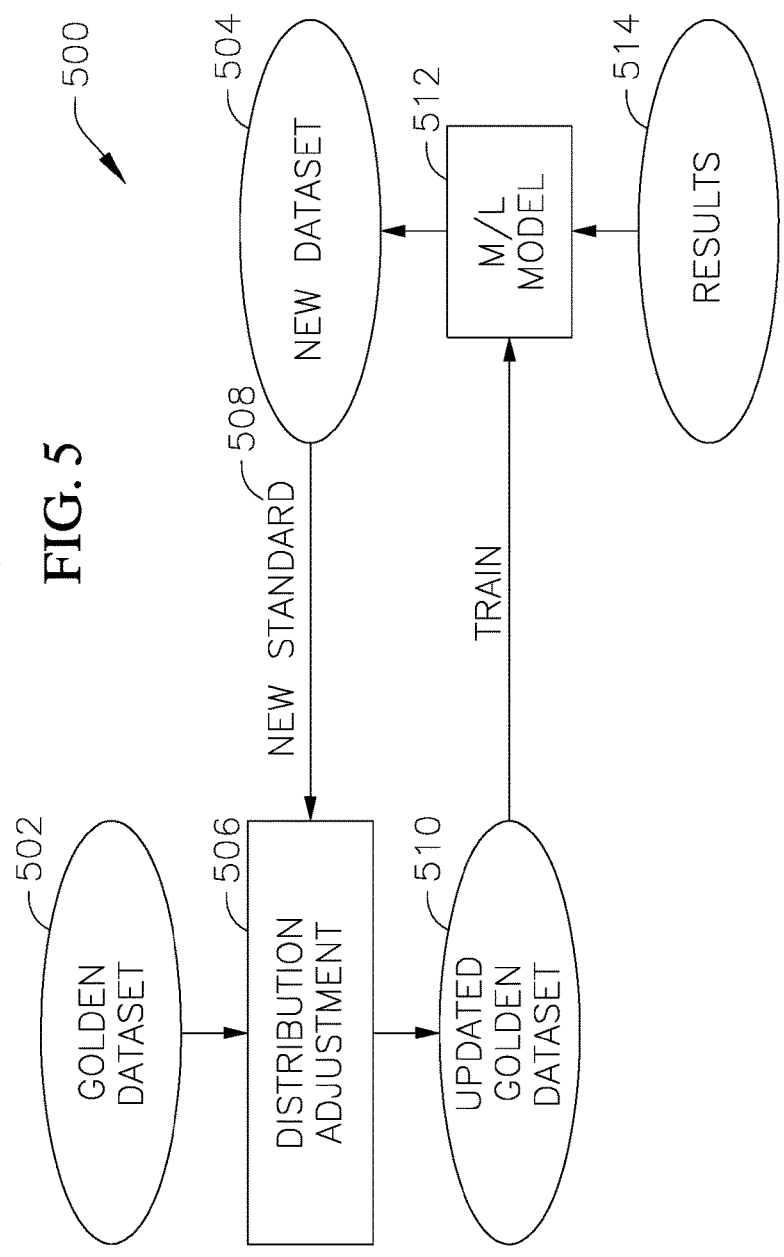
FIG. 5 illustrates an example block diagram of yet another adversarial training method, according to some embodiments of the present disclosure.

FIG. 5 illustrates an example block diagram of yet another adversarial training method 500. The adversarial training method 500 of FIG. 5 may be performed by a processor in a system that includes a memory and the processor is configured to execute instructions stored on the memory.

In the adversarial training method 500, a golden dataset 502 is received. The golden dataset 502 may include a first dataset labeling. A results dataset 514 may also be received. The results dataset 514 may include a second dataset labeling.

Optionally, a machine learning model 512 may be trained based on the dataset labeling of the golden dataset 502 (e.g., first dataset labeling).

The results dataset 514 is provided to the trained machine learning model 512 to relabel the results dataset 514. A new dataset 504 is generated based on the trained machine learning model 512. For example, the new dataset 504 is generated by classifying the results dataset 514 using the trained machine learning model 512. The new dataset 504 may have an updated dataset labeling (e.g., updated second dataset labeling) which is different from the dataset labeling for the results dataset 514 (e.g., second dataset labeling). For example, the new dataset 504 may include an updated second dataset labeling. In some embodiments, the results dataset 514 and the new dataset 504 may contain the same data but different labeling, for example, the results dataset 514 includes a second dataset labeling and the new dataset 504 includes an updated second dataset labeling. The new dataset 504 updates data sample labels for the data (of the results dataset 514) that have flipped to a new class after the machine learning model 512 is applied to the results dataset 514.

A first difference $\Delta_1$ is determined between the updated second dataset labeling and the second dataset labeling, where, $\Delta_1$=(updated second dataset labeling−second dataset labeling).

The first difference $\Delta_1$ is compared with a first threshold. If $\Delta_1$ is determined to be less than or equal to the first threshold value (approximately equal to zero), the golden dataset 502 is provided to the distribution adjustment module 506 and an updated golden dataset 510 is generated based on the new standard 508 or the dataset labeling of the new dataset 504 (e.g., second dataset labeling). The updated golden dataset 510 may have an updated dataset labeling which is different from the original dataset labeling or the first dataset labeling of the golden dataset 502.

Next, the dataset labeling of the updated golden dataset 510 (e.g., updated first dataset labeling) is compared with the dataset labeling of the golden dataset 502 (e.g., first dataset labeling) to determine a second difference $\Delta_2$ between the updated first dataset labeling and the first dataset labeling, where, $\Delta_2$=(updated first dataset labeling−first dataset labeling).

In some embodiments, the dataset labeling (e.g., updated first dataset labeling) of the updated golden dataset 510 in a current cycle is compared with the dataset labeling (e.g., first dataset labeling) of the same dataset in the previous cycle to determine $\Delta_2$.

If the $\Delta_2$ is less than or equal to a threshold (approximately equal to zero), the adversarial training method 500 ends. Otherwise, the machine learning model 512 is trained based on the dataset labeling of the updated golden dataset 510 (e.g., updated first dataset labeling) and the process 500 continues. The adversarial training method 500 may be finalized when the machine learning model 512 generate same results for both datasets (e.g., updated golden dataset 510 and new dataset 504).

By iteratively running the training procedures for the machine learning model 512 smaller differences or smaller $\Delta_2$ may be achieved for every iteration, which may provide more clear view for boundary since the inspectors only review data at the decision boundary.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although exemplary embodiments of an adversarial training method for noisy labels have been specifically described and illustrated herein, many modifications and variations will be apparent to those skilled in the art. Accordingly, it is to be understood that to an adversarial training method for noisy labels constructed according to principles of this disclosure may be embodied other than as specifically described herein. The inventive concept is also defined in the following claims, and equivalents thereof.

What is claimed is:

1. A system comprising:
   a memory; and
   a processor configured to execute instructions stored on the memory that, when executed by the processor, cause the processor to:
   receive a first dataset comprising a first dataset labeling;
   receive a second dataset comprising second dataset labeling;
   train a first machine learning model based on the first dataset labeling;
   provide the second dataset to the trained first machine learning model to generate an updated second dataset comprising an updated second dataset labeling, the updated second dataset being generated by classifying the second dataset using the trained first machine learning model;
   determine a first difference between the updated second dataset labeling and the second dataset labeling;
   train a second machine learning model based on the updated second dataset labeling if the first difference is greater than a first threshold value;
   provide the first dataset to the trained second machine learning model to generate an updated first dataset comprising an updated first dataset labeling, the updated first dataset being generated by classifying the first dataset using the trained second machine learning model;

determine a second difference between the updated first dataset labeling and the first dataset labeling; and train the first machine learning model based on the updated first dataset labeling if the second difference is greater than a second threshold value.

2. The system of claim 1, wherein the instructions further cause the processor to continue to:

train the first machine learning model and the second machine learning model until the first difference is below the first threshold value and the second difference is below the second threshold value.

3. The system of claim 2, wherein the first threshold value and the second threshold value are approximately equal to zero, wherein the first threshold value is different from the second threshold value.

4. The system of claim 1, wherein the instructions further cause the processor to continue to train the first machine learning model and the second machine learning model until both the first machine learning model and the second machine learning model produce the same dataset labeling results when applied to the updated second dataset and the updated first dataset.

5. The system of claim 1, wherein the updated first dataset is generated by updating data sample labels for the data from the first dataset that have flipped to a new class after the trained second machine learning model is applied to the first dataset.

6. The system of claim 1, wherein the updated first dataset labeling is different from the first dataset labeling.

7. The system of claim 6, wherein the first dataset is relabeled by live human inspectors according to the updated second dataset labeling to generate the updated first dataset.

8. The system of claim 1, wherein the first machine learning model and the second machine learning model are classification algorithms.

9. The system of claim 1, wherein the updated second dataset is generated by updating data sample labels for the data from the second dataset that have flipped to a new class after the trained first machine learning model is applied to the second dataset.

10. The system of claim 1, wherein the first dataset is classified or labeled by live human inspectors.

11. A system comprising:
a memory; and
a processor configured to execute instructions stored on the memory that, when executed by the processor, cause the processor to:
train a first machine learning model based on a first dataset labeling of a first dataset;
provide a second dataset comprising second dataset labeling to the trained first machine learning model to generate an updated second dataset comprising an updated second dataset labeling;
train a second machine learning model based on the updated second dataset labeling;
provide the first dataset to the trained second machine learning model to generate an updated first dataset comprising an updated first dataset labeling; and
train the first machine learning model based on the updated first dataset labeling.

12. The system of claim 11, wherein the instructions further cause the processor to continue to:
determine a first difference between the updated second dataset labeling and the second dataset labeling, wherein the second machine learning model is trained based on the updated second dataset labeling if the first difference is greater than a first threshold value;
determine a second difference between the updated first dataset labeling and the first dataset labeling, wherein the first machine learning model is trained based on the updated first dataset labeling if the second difference is greater than a second threshold value; and
train the first machine learning model and the second machine learning model until the first difference is below the first threshold value and the second difference is below the second threshold value.

13. The system of claim 12, wherein the first threshold value and the second threshold value are approximately equal to zero, wherein the first threshold value is different from the second threshold value.

14. The system of claim 11, wherein the updated first dataset being generated by classifying the first dataset using the trained second machine learning model and the updated second dataset is generated by classifying the second dataset using the trained first machine learning model.

15. The system of claim 11, wherein the instructions further cause the processor to continue to train the first machine learning model and the second machine learning model until both the first machine learning model and the second machine learning model produce the same dataset labeling results when applied to the updated second dataset and the updated first dataset.

16. The system of claim 11, wherein:
the updated first dataset is generated by updating data sample labels for the data from the first dataset that have flipped to a new class after the trained second machine learning model is applied to the first dataset,
the updated first dataset labeling is different from the first dataset labeling, and
the first dataset is relabeled by live human inspectors according to the updated second dataset labeling to generate the updated first dataset.

17. The system of claim 11, wherein the first machine learning model and the second machine learning model are classification algorithms, wherein the first dataset is classified or labeled by live human inspectors, and wherein the updated second dataset is generated by updating data sample labels for the data from the second dataset that have flipped to a new class after the trained first machine learning model is applied to the second dataset.

18. A method comprising:
training, by a processor, a first machine learning model based on a first dataset labeling of a first dataset;
providing, by the processor, a second dataset comprising second dataset labeling to the trained first machine learning model to generate an updated second dataset comprising an updated second dataset labeling;
training, by the processor, a second machine learning model based on the updated second dataset labeling;
providing, by the processor, the first dataset to the trained second machine learning model to generate an updated first dataset comprising an updated first dataset labeling; and
training, by the processor, the first machine learning model based on the updated first dataset labeling.

19. The method of claim 18, further comprising
determining, by the processor, a first difference between the updated second dataset labeling and the second dataset labeling, wherein the second machine learning model is trained based on the updated second dataset labeling if the first difference is greater than a first threshold value;

determining, by the processor, a second difference between the updated first dataset labeling and the first dataset labeling, wherein the first machine learning model is trained based on the updated first dataset labeling if the second difference is greater than a second threshold value; and training, by the processor, the first machine learning model and the second machine learning model until the first difference is below the first threshold value and the second difference is below the second threshold value.

20. The method of claim 19, wherein the first threshold value and the second threshold value are approximately equal to zero, wherein the first threshold value is different from the second threshold value, and wherein the updated first dataset being generated by classifying the first dataset using the trained second machine learning model and the updated second dataset is generated by classifying the second dataset using the trained first machine learning model.

* * * * *